United States Patent [19]

Klusman

[11] Patent Number: 4,509,804
[45] Date of Patent: Apr. 9, 1985

[54] BEARING MOUNT WITH SQUEEZE FILM DAMPING

[75] Inventor: Steven A. Klusman, Indianapolis, Ind.

[73] Assignee: General Motors Corporation, Detroit, Mich.

[21] Appl. No.: 498,969

[22] Filed: May 27, 1983

[51] Int. Cl.³ .............................................. F16C 27/04
[52] U.S. Cl. ...................................................... 384/99
[58] Field of Search .......... 308/184 R, 184 A, 189 R, 308/207 R; 384/99, 100, 215, 192, 202

[56] References Cited

U.S. PATENT DOCUMENTS

| | | | |
|---|---|---|---|
| 2,639,953 | 5/1953 | Cook | 308/184 R |
| 3,357,757 | 12/1967 | Morley et al. | 308/184 R |
| 3,373,633 | 3/1968 | Desmond et al. | 384/215 X |
| 3,424,508 | 1/1969 | Kizer et al. | 308/184 R |
| 3,473,853 | 10/1969 | Goss et al. | 384/215 X |

Primary Examiner—Stuart S. Levy
Assistant Examiner—David Werner
Attorney, Agent, or Firm—Saul Schwartz

[57] ABSTRACT

In a mount for a bearing on a high speed shaft subject to radial and axial vibratory displacement, a tube around the shaft having a first end rigidly connected to the bearing so that the tube vibrates with the shaft, an annular diaphragm spring with an inner diameter whereat a second end of the tube is rigidly attached and an outer diameter and a resilient planar portion therebetween, an annular shim between the diaphragm spring and a stationary parallel surface, a seal between the diaphragm spring and the parallel surface which cooperates with the shim and the parallel surface and the diaphragm spring planar portion in defining an annular squeeze film chamber, and means for maintaining the squeeze film chamber filled with fluid. When the shaft vibrates radially, the diaphragm spring planar portion distorts and the distortion orbits the squeeze film chamber wherein a resisting force is developed by the fluid to damp the vibrations. Axial vibrations of the shaft are also damped while the diaphragm spring resiliently centers the shaft and bearing about the axis.

4 Claims, 3 Drawing Figures

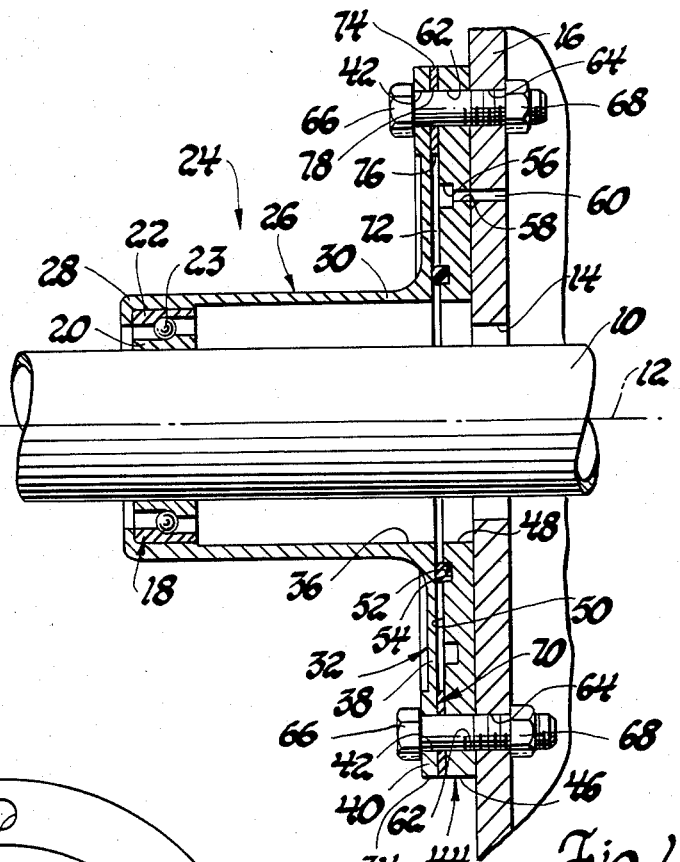
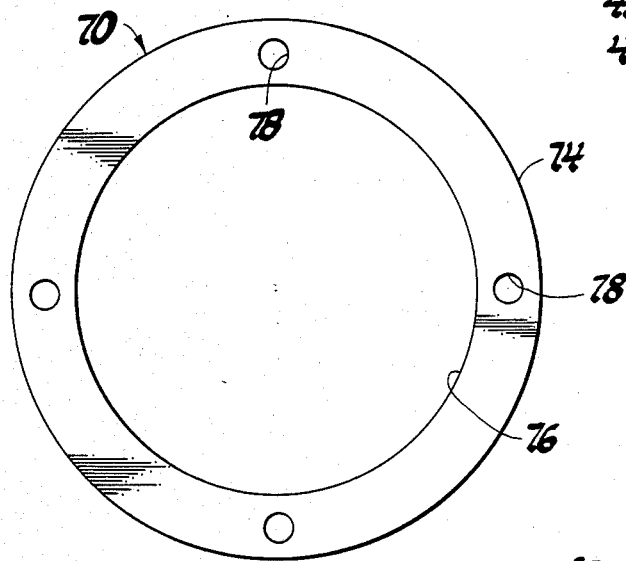
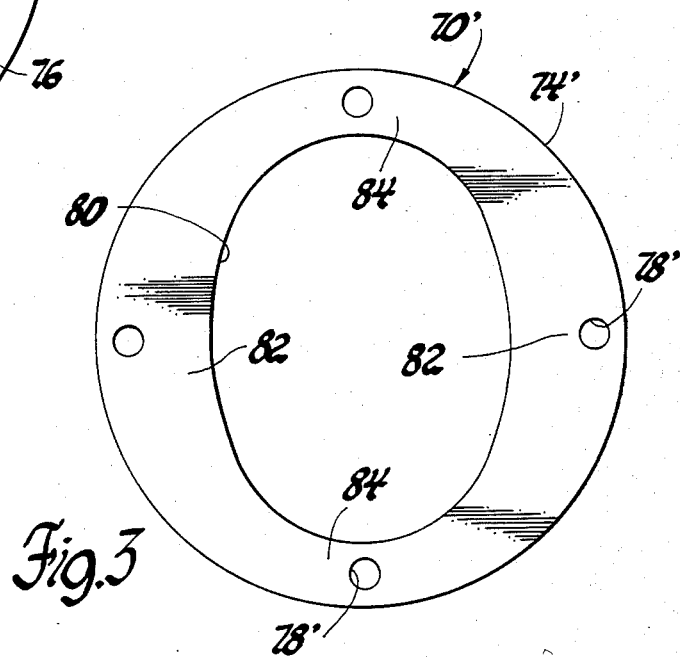

4,509,804

BEARING MOUNT WITH SQUEEZE FILM DAMPING

BACKGROUND OF THE INVENTION

1. Field of the Invention

This invention relates generally to vibration damping bearing mounts and, more particularly, to a new and improved squeeze film damping type mount with resilient centering capability.

2. Description of the Prior Art

In devices such as gas turbine engines, where shafts rotate at relatively high speeds, shaft bearing mounts have been proposed which incorporate both resilient centering capability and squeeze film damping to control shaft vibrations. Typically these proposals have included constant rate springs for maintaining static concentricity and cylindrical annular squeeze film chambers wherein forces are developed by a fluid film to damp radial shaft vibrations. While generally effective for centering and radial damping, such arrangements require precision manufacturing techniques to maintain concentricity between the cylindrical surfaces defining the squeeze film chambers and are ineffective for damping axial shaft vibrations. In a bearing mount according to this invention, resilient centering capability and squeeze film damping capability for both radial and axial vibrations are combined in a structure which can be adapted to better resist non-synchronous vibrations and which lends itself to relatively economical manufacturing techniques.

SUMMARY OF THE INVENTION

The primary feature, then, of this invention is that it provides a new and improved bearing mount including resilient centering and squeeze film damping capabilities. Another feature of this invention is that it provides a new and improved bearing mount having squeeze film damping capability for axial and radial vibrations which can also be adapted to better resist non-synchronous radial vibrations. Still another feature of this invention resides in the provision in the new and improved bearing mount of a diaphragm spring which functions as both a resilient centering member and a surface of a planar annular squeeze film chamber. A still further feature of this invention resides in the provision in the new and improved bearing mount of a tube centrally connected at one end to the diaphragm spring and carrying at the other end the shaft bearing so that both radial and axial vibratory deflections are transmitted to the diaphragm spring which deflects accordingly and in so doing disturbs the fluid in the squeeze film chamber in a manner giving rise to resisting forces which damp the vibrations. Yet another feature of this invention resides in the provision in the new and improved bearing mount of a support plate parallel to the diaphragm spring for cooperation therewith in defining the squeeze film chamber and in the provision of a shim between the support plate and the diaphragm spring at the outer diameter of the latter for controlling the depth of the squeeze film chamber. And a still further feature of this invention resides in the provision in the new and improved bearing mount of a shim having non-symmetrical planar configurations to alter the stiffness distribution of the diaphragm spring for controlling non-synchronous vibrations. These and other features of this invention will be readily apparent from the following specification and from the drawings wherein:

FIG. 1 is a side elevational view, partly in section, of a new and improved bearing mount according to this invention;

FIG. 2 is a plan view of a symmetrical shim for disposition between the diaphragm spring and the support plate of a bearing mount according to this invention; and FIG. 3 is similar to FIG. 2 but showing a non-symmetrical shim.

Referring now to FIG. 1 of the drawings, a schematically represented shaft 10 is aligned on a longitudinal axis 12 for relatively high speed rotation thereabout and projects through a circular aperture 14 in a wall 16 disposed in a transverse plane perpendicular to the axis 12 and stationary relative to the shaft. An anti-friction bearing 18 is disposed on the shaft 10 and includes an inner race 20 rigidly attached to the shaft 10, an outer race 22, and a plurality of anti-friction bearing balls 23 between the inner and outer races. The bearing 18 is supported on the wall 16 by a bearing mount according to this invention and designated generally 24.

The bearing mount 24 includes a tube 26 having a first or left end 28 and a second or right end 30. The tube 26 is disposed around the shaft 10 and has the outer race 22 of the bearing 18 rigidly attached at the first end 28, as by press fitting, so that radial vibrations transverse of axis 12 and axial vibrations along axis 12 are transmitted to the tube 26 through the bearing 18. As used herein, the term radial vibration refers to vibratory displacement of the shaft 10 and bearing 18 in a plane perpendicular to axis 12 and the term axial vibration refers to vibratory displacement of the shaft 10 and bearing 18 along the axis 12. A diaphragm spring 32 formed integrally with the tube 26 has an outer diameter 34, an inner diameter 36 whereat the diaphragm spring merges with the tube 26 at the second end 30 of the latter, and an annular planar portion 38 therebetween. While the tube and diaphragm spring are shown as an integral unit, they may be separate components joined by known attachment methods. An annular boss 40 is formed around the diaphragm spring 32 at the outer diameter 34 and is perforated by a plurality of evenly angularly spaced apertures, only a diametrically opposed pair of apertures 42 being shown in FIG. 1.

The bearing mount 24 further includes an annular support plate 44 having an outer diameter 46 corresponding generally to the outer diameter 34 of the diaphragm spring, an inner diameter 48 similarly corresponding to the inner diameter 36 of the diaphragm spring, and an outboard surface 50 facing the diaphragm spring. An O-ring type seal 52 is disposed in an appropriate annular groove 54 in outboard surface 50 of the support plate and bears against the diaphragm spring adjacent the inner diameter 36 of the latter. A centrally located annular groove 56 in the outboard surface 50 of the support plate communicates with a passage 58 extending through the support plate. The support plate abuts the wall 16 and is indexed such that the passage 58 registers with a similar passage 60 in the wall, the passage 60 being in communication with a source of fluid under pressure, not shown, such as conventional hydraulic fluid.

A plurality of apertures 62 in the support plate corresponding in angular spacing and number to the apertures 42 in the boss 40 of the diaphragm spring register with the apertures 42 and a similar plurality of apertures 64 in the wall 16. A plurality of bolts 66 projecting through the registered apertures 42, 62 and 64 receive on threaded ends a corresponding plurality of nuts 68 and function to clamp the diaphragm spring and the support plate to the wall 16. The diaphragm spring is maintained in spaced relationship with respect to the outboard surface 50 of the support plate by an annular shim 70, FIGS. 1 and 2. The shim, the O-ring seal 52, the diaphragm spring and the outboard surface 50 of the support plate cooperate in defining a planar annular squeeze film chamber 72 which is maintained filled with fluid through the passages 58 and 60 and the groove 56.

As seen best in FIG. 2, the shim 70 is annular in plan view and includes an outer diameter 74, a concentric inner diameter 76 and a plurality of apertures 78 permitting passage of the bolts 66. The diaphragm spring 32 is fabricated from material having inherent resilience, such as spring steel, so that the planar portion 38 naturally assumes an undeflected position, FIG. 1, parallel to outboard surface 50 of the support plate. When the first end 28 of tube 26 is deflected radially relative to axis 12, the planar portion deflects in an S shape, not shown, across the span between the inner diameter 76 of the shim and the inner diameter 36 of the spring causing local collapse of the squeeze film chamber 72. Similarly, when the first end 28 of the tube 26 is deflected axially relative to axis 12, the planar portion 38 of the diaphragm deflects toward or away from the outboard surface 50 to expand or contract the squeeze film chamber equally around the axis 12.

Describing now the operation of the bearing mount 24, in the static condition where shaft 10 is at rest, the weight of the shaft is transmitted to the tube 26 at its first end 28 through the bearing 18 and tends to tilt the first end of the tube downward. The planar portion 38 of the diaphragm spring 32, however, has a thickness and stiffness designed to resist static downward deflection with substantially no distortion from the planar undeflected position. Accordingly, the tube 26 resiliently supports the shaft 10 in centered or concentric relationship to the axis 12.

Under dynamic conditions, where the shaft 10 rotates at relatively high speed, unbalances in the shaft generally resolve themselves into a single radially directed resultant force which orbits or rotates with the shaft 10. Because the magnitude of the resultant force is proportional to the square of shaft speed, at high speeds the magnitude of the orbiting force significantly exceeds the static weight of the shaft, and the corresponding resistance to displacement offered by the diaphragm spring 32. Accordingly the planar portion 38 of the spring distorts in a general S-shape between the inner diameter 36 and the inner diameter 76 of the shim 70 until the resistance of the spring equals the magnitude of the resultant force. The distortion of the spring causes localized collapse of the squeeze film chamber 72 at the same angular orientation as the resultant force and, since the resultant force orbits with respect to axis 12, the localized collapse of the squeeze film chamber 72 likewise orbits and tends to push the fluid in the squeeze film chamber around the annulus. The fluid, however, resists such movement and develops a force counter to the orbiting resultant force which tends to damp the radial vibrations of the shaft 10.

During rotation, the shaft 10 may also experience axial vibrations as a result of forces developed in a coupling, for example, which vibrations are also transmitted to the tube 26 through the bearing 18 and to the diaphragm spring 32 at the inner diameter 36. Such axial vibrations tend to deflect the inner diameter 36 of the spring evenly in opposite axial directions until spring resistance equals the magnitude of the distorting force thereby alternately expanding and contracting the squeeze film chamber 72. During a contraction cycle, fluid is forced from the squeeze film chamber back into the groove 56 and, during an expansion cycle, the fluid is drawn in the opposite direction. During both cycles the seal 52 and the shim 70 maintain the integrity of the squeeze film chamber. Because the expansion and contraction cycles are very rapid, the fluid in the squeeze film chamber resists displacement and develops forces counter to the induced vibrations which forces, accordingly, damp the axial vibrations.

In the embodiment of FIGS. 1 and 2, the shim 70 has concentric inner and outer diameters 76 and 74, respectively, as described. Accordingly, the radial distance or span between the inner diameter 36 of the diaphragm spring and the inner diameter 76 of the shim is the same at any angular location around the axis 12 so that the planar portion distorts in S-shaped fashion across a constant span. The stiffness or resistance to S-shaped distortion is thus constant around the planar portion 38. In applications where non-synchronous vibrations may exist, as where a spline connection is present in which friction forces generate non-synchronous vibrations, it may be desirable to stiffen the planar portion 38 at angular positions to make the diaphragm asymmetric in stiffness. This aids in reducing the response to these excitations.

To this end a modified shim 70', FIG. 3, is provided for disposition between the diaphragm spring 32 and the support plate 44. The modified shim 70' is of constant thickness and has an outer diameter 74' corresponding to outer diameter 34 of the diaphragm spring. An oval shaped aperture 80 in the shim produces a pair of wide sections 82 and a pair of narrow sections 84 between the outer diameter and the aperture. When shim 70' is placed between the diaphragm spring and the support plate, the span across which the planar portion 38 deflects in S-shape fashion varies from short to long at sections 82 and 84, respectively, so that the stiffness of the planar portion varies from most stiff at the shortest span at long sections 82 to least stiff at the largest span at short section 84.

The embodiments of the invention in which an exclusive property or privilege is claimed are described as follows:

1. In a mount for a bearing on a shaft rotatable about a longitudinal axis and subject with said bearing to radial and axial vibratory displacement relative to said axis, the combination comprising, a tube aligned on said axis and including a first end and a second end, means mounting said bearing on said tube at said first end for vibratory displacement therewith, a diaphragm spring having an outer diameter and a resilient planar portion, means rigidly connecting said tube at said second end thereof to said diaphragm spring, means attaching said diaphragm spring at said outer diameter thereof to a structure fixed relative to said shaft so that each of said radial and axial vibratory deflections of said tube vibratorily distorts said diaphragm spring planar portion, wall means in spaced parallel relation to said diaphragm spring planar portion cooperating therewith in defining a planar squeeze film chamber, and means for maintaining said squeeze film chamber filled with fluid so that vibratory distortion of said diaphragm spring planar portion is resisted and damped by forces developed in said fluid.

2. In a mount for a bearing on a shaft rotatable about a longitudinal axis and subject with said bearing to radial and axial vibratory displacement relative to said axis, the combination comprising, a tube aligned on said axis and including a first end and a second end, means mounting said bearing on said tube at said first end for vibratory displacement therewith, an annular diaphragm spring having an inner diameter and an outer diameter and a resilient planar portion therebetween, means rigidly connecting said tube at said second end thereof to said diaphragm spring at said inner diameter thereof, wall means parallel to said diaphragm spring planar portion, an annular shim disposed between said wall means and said diaphragm spring at said outer diameter of the latter and including an outer diameter and a concentric inner diameter, said shim separating said wall means and said diaphragm spring planar portion and cooperating therewith in defining an annular planar squeeze film chamber and said diaphragm spring planar portion being vibratorily distortable between said shim inner diameter and said diaphragm spring inner diameter, and means for maintaining said squeeze film chamber filled with fluid so that vibratory distortion of said diaphragm spring planar portion is resisted and damped by forces developed in said fluid.

3. The combination recited in claim 2 wherein said shim has an outer diameter and a non-circular aperture therethrough defining a non-circular inner edge so that the span between said shim inner edge and said diaphragm spring inner diameter is variable in length thereby to vary the stiffness of said diaphragm spring planar portion to vibratory distortion across said span.

4. In a support for a bearing on a shaft rotatable about a longitudinal axis and subject with said bearing to radial and axial vibratory displacement relative to said axis, said shaft projecting through an aperture in a wall disposed in a plane perpendicular to said axis, the combination comprising, a tube disposed around said shaft and including a first end and a second end, means mounting said bearing on said tube at said first end for vibratory displacement therewith, an annular diaphragm spring disposed around said shaft having an inner diameter and an outer diameter and a resilient planar portion therebetween parallel to said wall, means rigidly connecting said tube at said inner diameter thereof, a support plate on said wall having an outboard surface parallel to said diaphragm spring planar portion, a seal between said outboard surface and said diaphragm spring at said inner diameter of the latter, an annular shim disposed between said outboard surface and said diaphragm spring at said outer diameter of the latter and including an outer diameter and a concentric inner diameter, said shim separating said outboard surface and said diaphragm spring planar portion and cooperating therewith and with said seal in defining an annular planar squeeze film chamber and said diaphragm spring planar portion being vibratorily distortable between said shim inner diameter and said diaphragm spring inner diameter, and means for maintaining said squeeze film chamber filled with fluid so that vibratory distortion of said diaphragm spring planar portion is resisted and damped by forces developed in said fluid.

* * * * *